(12) United States Patent
Yukich

(10) Patent No.: US 9,479,768 B2
(45) Date of Patent: **\*Oct. 25, 2016**

(54) SYSTEMS AND METHODS FOR CREATING THREE-DIMENSIONAL IMAGE MEDIA

(76) Inventor: Bartholomew Garibaldi Yukich, Sherman Oaks, CA (US)

( * ) Notice: Subject to any disclaimer, the term of this patent is extended or adjusted under 35 U.S.C. 154(b) by 765 days.

This patent is subject to a terminal disclaimer.

(21) Appl. No.: 13/562,081

(22) Filed: Jul. 30, 2012

(65) Prior Publication Data

US 2012/0293632 A1 Nov. 22, 2012

Related U.S. Application Data

(63) Continuation-in-part of application No. 12/481,387, filed on Jun. 9, 2009, now Pat. No. 8,233,032.

(51) Int. Cl.
*H04N 13/02* (2006.01)
*H04N 13/04* (2006.01)
*H04N 5/247* (2006.01)

(52) U.S. Cl.
CPC .......... *H04N 13/0493* (2013.01); *H04N 5/247* (2013.01); *H04N 13/0242* (2013.01); *H04N 13/0497* (2013.01)

(58) Field of Classification Search
CPC .............. H04N 13/0242; H04N 13/0493; H04N 13/0497; H04N 5/247
USPC .......................................................... 348/47
See application file for complete search history.

(56) References Cited

U.S. PATENT DOCUMENTS

| 4,901,140 | A | | 2/1990 | Lang et al. | |
| 4,943,851 | A | * | 7/1990 | Lang et al. | 348/37 |
| 4,979,026 | A | | 12/1990 | Lang et al. | |
| 5,023,725 | A | * | 6/1991 | McCutchen | 348/38 |
| 5,546,120 | A | * | 8/1996 | Miller et al. | 348/59 |
| 5,729,471 | A | * | 3/1998 | Jain et al. | 725/131 |
| 5,880,704 | A | * | 3/1999 | Takezaki | 345/6 |
| 5,954,414 | A | | 9/1999 | Tsao | |
| 6,064,423 | A | | 5/2000 | Geng | |
| 6,072,545 | A | | 6/2000 | Gribschaw et al. | |
| 6,084,979 | A | * | 7/2000 | Kanade et al. | 382/154 |
| 6,304,284 | B1 | * | 10/2001 | Dunton et al. | 348/36 |
| 6,669,346 | B2 | * | 12/2003 | Metcalf | 353/94 |
| 6,778,207 | B1 | * | 8/2004 | Lee et al. | 348/36 |
| 6,809,728 | B2 | * | 10/2004 | Terauchi et al. | 345/420 |
| 6,950,153 | B2 | | 9/2005 | Lane | |
| 6,980,302 | B2 | * | 12/2005 | Knighton et al. | 356/607 |
| 7,006,709 | B2 | * | 2/2006 | Kang et al. | 382/294 |
| 7,463,280 | B2 | * | 12/2008 | Steuart, III | 348/36 |

(Continued)

*Primary Examiner* — Shan Elahi
(74) *Attorney, Agent, or Firm* — Lowry Blixseth LLP; Scott M. Lowry

(57) ABSTRACT

The method for producing media content that reproduces a three-dimensional object as an image appearing three-dimensionally in association with a display device includes capturing a plurality of images of a three-dimensional object with a plurality of cameras positioned at different angles. At least three of the images are synchronized to be reproduced in association with the display device. Then, a computer system assigns at least three synchronized images to the display device viewable from at least three different perspectives to visually replicate the three-dimensional object as captured by at least three cameras at at least three different angles such that the image appears three-dimensional when moving among the at least three perspectives as if moving around the three-dimensional object itself.

20 Claims, 14 Drawing Sheets

(56) References Cited

U.S. PATENT DOCUMENTS

| | | | |
|---|---|---|---|
| 7,466,336 B2* | 12/2008 | Regan et al. | 348/50 |
| 7,538,797 B2 | 5/2009 | Li et al. | |
| 7,542,073 B2* | 6/2009 | Li et al. | 348/218.1 |
| 7,689,003 B2 | 3/2010 | Shannon et al. | |
| 8,305,456 B1* | 11/2012 | McMahon | H04N 5/2258 348/207.1 |
| 8,395,490 B2* | 3/2013 | Yuda | 340/436 |
| 8,441,520 B2* | 5/2013 | Dahi et al. | 348/47 |
| 8,666,657 B2* | 3/2014 | Meadow et al. | 701/436 |
| 8,705,892 B2* | 4/2014 | Aguilera et al. | 382/285 |
| 8,810,632 B2* | 8/2014 | Hwang et al. | 348/47 |
| 8,922,670 B2* | 12/2014 | Silverbrook | 348/222.1 |
| 2001/0040671 A1* | 11/2001 | Metcalf | 353/94 |
| 2002/0085219 A1* | 7/2002 | Ramamoorthy | 358/1.9 |
| 2002/0105513 A1 | 8/2002 | Chen | |
| 2002/0126396 A1* | 9/2002 | Dolgoff | 359/743 |
| 2003/0019932 A1* | 1/2003 | Tsikos et al. | G02B 26/10 235/454 |
| 2003/0067536 A1* | 4/2003 | Boulanger et al. | 348/14.08 |
| 2003/0220723 A1* | 11/2003 | Bonilla et al. | 701/2 |
| 2003/0235344 A1* | 12/2003 | Kang et al. | 382/284 |
| 2004/0001138 A1* | 1/2004 | Weerashinghe et al. | 348/36 |
| 2004/0019413 A1* | 1/2004 | Bonilla et al. | 701/2 |
| 2004/0061774 A1* | 4/2004 | Wachtel et al. | 348/36 |
| 2004/0226200 A1 | 11/2004 | Salley | |
| 2004/0263611 A1* | 12/2004 | Cutler | 348/36 |
| 2005/0002544 A1* | 1/2005 | Winter et al. | 382/104 |
| 2005/0152156 A1* | 7/2005 | Favalora et al. | 362/558 |
| 2005/0185711 A1 | 8/2005 | Pfister et al. | |
| 2005/0207487 A1* | 9/2005 | Monroe | G08B 13/19628 375/240.01 |
| 2005/0253924 A1 | 11/2005 | Mashitani | |
| 2006/0023105 A1* | 2/2006 | Kostrzewski et al. | 348/335 |
| 2006/0072851 A1* | 4/2006 | Kang et al. | 382/294 |
| 2006/0072852 A1* | 4/2006 | Kang et al. | 382/294 |
| 2006/0171008 A1 | 8/2006 | Mintz et al. | |
| 2006/0171028 A1 | 8/2006 | Oikawa et al. | |
| 2006/0221250 A1* | 10/2006 | Rossbach et al. | G01S 17/89 348/630 |
| 2007/0171275 A1* | 7/2007 | Kenoyer | H04N 5/2258 348/14.08 |
| 2007/0223090 A1* | 9/2007 | Dolgoff | G02B 27/2278 359/478 |
| 2008/0024595 A1 | 1/2008 | Garcia Galarriaga | |
| 2008/0079808 A1* | 4/2008 | Ashlock et al. | 348/118 |
| 2008/0144175 A1* | 6/2008 | Simonsen | 359/479 |
| 2008/0246757 A1 | 10/2008 | Ito | |
| 2009/0109404 A1* | 4/2009 | Thornton | 353/10 |
| 2009/0303313 A1* | 12/2009 | Yukich | 348/48 |
| 2010/0007719 A1 | 1/2010 | Frey et al. | |
| 2010/0026809 A1* | 2/2010 | Curry | 348/157 |
| 2010/0166294 A1 | 7/2010 | Marrion et al. | |
| 2010/0191541 A1* | 7/2010 | Prokoski | A61B 5/0064 705/2 |
| 2010/0215250 A1* | 8/2010 | Zhu | 382/154 |
| 2010/0225735 A1* | 9/2010 | Shaffer et al. | 348/14.08 |
| 2010/0315215 A1* | 12/2010 | Yuda | 340/435 |
| 2011/0249100 A1* | 10/2011 | Jayaram et al. | H04N 5/2253 348/48 |
| 2012/0120069 A1* | 5/2012 | Kodaira et al. | 345/419 |
| 2012/0154521 A1* | 6/2012 | Townsend et al. | 348/36 |
| 2012/0293632 A1* | 11/2012 | Yukich | 348/47 |

* cited by examiner

SYSTEMS AND METHODS FOR CREATING THREE-DIMENSIONAL IMAGE MEDIA

BACKGROUND OF THE INVENTION

The present invention generally relates to media for three-dimensional image generation systems. More particularly, the present invention relates to systems and methods for creating three-dimensional image media for use with a display system that reproduces the appearance of a three-dimensional object as if the object is suspended in air and appears solid as the viewer changes viewing perspectives by, for example, walking around the display system.

Creating images which appear to be suspended in the air are well known. For example, U.S. Pat. No. 4,979,026 to Lang et al. discloses a 360° viewing system for presenting an image in space that is rotated extremely rapidly so that an entire audience, regardless of an individual's position about the viewing system, can view the same image substantially simultaneously and continuously. An electronic image rotation system distorts, processes and rotates an image upon a cathode ray tube and a parabolic mirror arrangement which projects the image from the cathode ray tube to provide a rotating real image in space. A rotatable polarized screen and a separate stationary polarized screen cooperate to define a viewing window which remains continually aligned with the rotating real image in space.

U.S. Pat. No. 4,901,140 to Lang et al. is similar to U.S. Pat. No. 4,979,026, but utilizes a liquid crystal display screen to define a filtered viewing window which is continuously redefined at sequential intervals to remain continually aligned with the rotating real image in space.

U.S. Pat. No. 4,943,851 to Lang et al. discloses another viewing system for presenting a projected image upon a rear projection screen that is rotated extremely rapidly about a vertical axis which exactly bisects the picture in the vertical plane. The rotational rate is such that an entire audience, regardless of their position about the viewing system, can view the projected image simultaneously.

U.S. Pat. No. 6,072,545 to Gribschaw et al. discloses another image rotating apparatus which presents a projected video image upon a rear projection screen that is rotated extremely rapidly about a vertical axis such that an entire audience, regardless of their position about the apparatus can view the projected video image simultaneously. The video image rotating apparatus utilizes light valve technology to create red, green and blue images from an analog composite video signal, and a prism that aligns the images produced by the light valve for projection through an optical system. The image produced by the light valve is rotated in synchronization with the rotation of the projection screen.

U.S. Pat. No. 6,950,153 to Lane discloses a video imaging rotating apparatus which includes a rear projection screen rotatably disposed in a generally horizontal plane. Thus, only a single mirror which is angularly positioned over the screen can be used to project the video images to viewers.

Although the foregoing patents disclose various systems and methods for creating a video image such that an audience, regardless of their position about the apparatus, can view the same projected video image simultaneously, all of the foregoing systems and methods attempt to replicate what would be the equivalent of a television screen image. That is, the image is substantially two dimensional in character such that each member of the audience, regardless of position, views the exact same angle or image. Thus, for example, if a front of a car were being projected as an image, every audience member seated around the apparatus would view the front of the car nearly simultaneously. Thus, while these methods and systems overcome the disadvantage of having a single television screen associated with conventional image displays, these methods and systems do not present a true three-dimensional image in which various angles of the image can be viewed by repositioning the viewing angle of the individual viewing the image.

The creation of three-dimensional objects on a conventional two-dimensional display, such as a computer monitor or television is well known. However, only those immediately in front of the computer monitor or television screen can view the image, and rotation of the image using software is required to view the various angles of the three-dimensional image. Moreover, such methodologies and systems do not give the appearance of a three-dimensional object being suspended in space and viewable from different views and angles in all directions of a 360° angle by multiple members of an audience simultaneously.

Another well known three-dimensional approach is for the user to wear filtering glasses which present a stereoscopic-type display, wherein images from the television or projector screen appear to be three-dimensional. Once again, the viewer must be positioned immediately in front of the screen, and furthermore must wear the specially designed glasses in order to view such images, and the three-dimensional images are limited to the viewing angle in which they are created.

One of the earlier approaches of displaying a volumetric three-dimensional image was by the use of a Varifocal mirror. This consisted of a vibrating mirror and a stationary cathode ray tube (CRT). A series of cross-sectional images are displayed in sequence on this CRT, which, as viewed through a flexion from the vibrating mirror, forms a volumetric three-dimensional image. However, this approach has a very limited view angle because the images are inside of the mirror.

Another type of display utilizes a rotating or reciprocating light emitting diode (LED) matrix. A sequence of two-dimensional cross-sectional images is displayed as the LED matrix rotates or moves in space to create the three-dimensional images. However, moving large area LED panels at high frequency creates reliability problems and signal coupling issues.

Another type of volumetric three-dimensional display uses the intersecting light spot of a scanning laser beam, or other electron beam, on a moving screen or disk which sweeps across a volume to generate three-dimensional images. However, such point scanning methodologies are seriously limited by data rate, resolution, brightness and color. As a result, only wire frame or course bit images are possible.

U.S. Pat. No. 5,954,414 to Tsao discloses an approach for displaying volumetric three-dimensional images. The method projects a series of frames of two-dimensional images, through an optical mechanical image delivery system, onto a translucent screen which moves periodically and sweeps a space. As viewed from outside the space, the series of two-dimensional images distributed in the space form a volumetric image because of the after-image effect of human eyes. Thus, many viewers can walk around the space and see the image from many angles simultaneously without wearing any kind of glasses.

U.S. Pat. No. 6,064,423 to Geng also discloses a process and system for creating volumetric three-dimensional images. The process and system utilizes a sequence of helical slices of three-dimensional data to generate a series of two-dimensional images on a reflective surface of a light modulator. These are projected into a volumetric three-dimensional space display using an illumination light source and projection optics. Once again, a three-dimensional image is generated which can be viewed from any angle in a walk-around manner without utilizing any viewing aids.

U.S. Patent Publication No. US 2006/0171008 A1 to Mintz et al. discloses another three-dimensional hologram display system. The projector device projects an image upon the display medium to form a three-dimensional hologram. The three-dimensional hologram is formed such that a viewer can view the holographic image from multiple angles up to 360°.

Although the Tsao, Geng and Mintz et al. processes and systems create a three-dimensional image which appears to be suspended in air and which can be viewed from 360°, the problem with such images is that they are holograms, meaning that they are transparent such that one views the front and back of the image at the same time. Thus, although a three-dimensional image is presented, it is clear to the human eye that such an image is not real, and instead appears to be holographic or transparent in nature.

Accordingly, there is a continuing need for systems and methodologies for creating a three-dimensional image which appears to be suspended in space, and which many viewers can walk around the space and see the image from multiple directions simultaneously without wearing any kind of glasses, and in a manner such that the angle of the image appears to be solid and realistic. The present invention fulfills these needs, and provides other related advantages.

SUMMARY OF THE INVENTION

A method and process is disclosed herein for producing media content that reproduces a three-dimensional object as an image appearing three-dimensionally in association with a display device. Generally, the method and process includes capturing a plurality of images of a three-dimensional object with a plurality of cameras positioned at different angles. At least three of the images captured at different angles are synchronized to be reproduced in association with the display device. Then, a computer system assigns at least three synchronized images to the display device to be viewable from at least three different perspectives to visually replicate the three-dimensional object as captured by at least three cameras at at least three different angles such that the image appears three-dimensional when moving among the at least three different perspectives as if moving around the three-dimensional object itself.

The capturing step may further include recording the three-dimensional object from an array of cameras disposed at intermittent locations around the three-dimensional object. The array of cameras may be disposed in a cylindrical array of cameras at equidistant intervals, and include at least three cameras stacked on one another. Alternatively, the array may include a spherical array of cameras equidistantly disposed from the three-dimensional object along an invisible spherical boundary. In this embodiment, at least three of the cameras are positioned to record the three-dimensional object at an intersection point between a line of longitude and at least one of a line of latitude or a Riemannian circle. The recorded three-dimensional object can then be streamed to the display device for playback in real-time.

At least three of the cameras may angularly vary in an x-axis component, a y-axis component, and/or a z-axis component. The cameras in the cylindrical embodiment may vary in the x-axis and y-axis components only, while the cameras in the spherical embodiment may vary in the x-axis, a y-axis, and z-axis components. Preferably, the computer system senses the number of cameras and their relative positioning. In this respect, the computer system may compare the angular positioning of one image captured by one camera at one angle with another image captured by another camera at another angle to determine the relative x-axis, y-axis, and z-axis offset of the cameras relative to one another to calibrate the display device. This media content may be embedded with metadata including, but not limited to, information that includes the x-axis, y-axis, and z-axis offset. The computer system can then accurately reproduce the media content in association with the display device that includes either a projector or an LCD screen.

In an alternative embodiment, the method and process disclosed herein includes a similar method for producing media content that reproduces a three-dimensional object as an image appearing three-dimensionally in association with a display device. This embodiment includes capturing a plurality of images of a three-dimensional object with a plurality of cameras positioned at different angles. The associated computer system creates a recording of the three-dimensional object from these images. Preferably, a plurality of cameras are arranged in and disposed at equidistant intervals around the three-dimensional object to enhance the full three-dimensional effect. Here, at least three cameras may be stacked on one another to provide cylindrical depth to the recording.

Next, at least three of the images captured at different angles are synchronized to be reproduced in association with the display device. The computer system then assigns at least three synchronized images to the display device to be viewed from at least three different perspectives to visually replicate the three-dimensional object as captured by at least three cameras at at least three different angles such that the image appears three-dimensional when moving among the three different perspectives as if moving around the three-dimensional object itself. The images and/or recording may be streamed to the display device in real-time, wherein the display device includes a projector or an LCD screen.

In another aspect of this embodiment, the computer system may sense the number of cameras and their relative positioning by comparing the angular positioning of one image captured by one camera at one angle with another image captured by another camera at another angle. This enables the computer system to determine a relative x-axis, y-axis, and z-axis offset of one camera relative to another camera. This offset allows the computer system to calibrate the display device by aligning the relative x-axis, y-axis, and z-axis offset of the projector or LCD screen used in association with the display device. Such offset information may be embedded into the media content such that the x-axis, y-axis, and z-axis offsets are available during playback.

In another alternative embodiment, the method and process for producing media content that reproduces a three-dimensional object as an image appearing three-dimensionally in association with a display device may include capturing a plurality of images of a three-dimensional object with a plurality of cameras positioned at different angles and recording the three-dimensional object with a spherical array of cameras equidistantly disposed from the three-dimensional object along an invisible spherical boundary. In this embodiment, at least three of the images captured at different angles are synchronized to be reproduced in association with the display device. The computer system assigns at least three synchronized images to the display device viewable from at least three different perspectives to visually replicate the three-dimensional object as captured by at least three cameras at at least three different angles such that the image appears three-dimensional when moving among the three different perspectives as if moving around the three-dimensional object itself. Of course, the metadata in the media content may include embedding information such as an x-axis, y-axis, and/or z-axis offset of one image relative to another image.

Preferably, the computer system is able to sense the number of cameras and their relative positioning. In this respect, the computer system may be able to determine the location of cameras disposed at an intersection point between a line of longitude and at least one of a line of latitude or a Riemannian circle. Having the camera location in hand allows the computer system to further aid in calibrating the display device based on the relative x-axis, y-axis, and z-axis offset of the cameras. In the spherical embodiment, at least three of the cameras should angularly vary in an x-axis component, a y-axis component, and a z-axis component. More specifically, the sensing step includes comparing the angular positioning of one image captured by one camera at one angle with another image captured by another camera at another angle to determine the relative x-axis, y-axis, and z-axis offset of the cameras relative to one another. The computer system may stream the images to the display device in real-time, such as to a projector and or LCD screen.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention resides in systems and methods for creating three-dimensional image media for use with a display system that allows a viewer to walk around and see the image in three-dimensions from multiple perspectives, e.g., front, back, left and right sides, or at any one of a number of viewing perspectives 360° around the object, such as from planar, cylindrical or spherical perspectives. The system and method described herein creates the illusion of a three-dimensional image without having to wear special glasses, and is different from a three-dimensional volumetric display, as volumetric images are more like transparent holograms. The system and method uses actual film or digital photography or three-dimensional animation to record or render a plurality of viewable images from a number of different angles or perspectives on a projector or spinning screen. There are different methodologies for producing media content that reproduces the appearance of the three-dimensional object as if the object were suspended in air and appears solid so that it appears as if the object itself is being viewed as one changes viewing perspective of the display device. In this respect, some of the display systems may use a screen that spins at a rate of at least twenty-four frames per second. The screen should only be viewable when its rotation is perpendicular to the viewer and the material displayed should be created based on matching the number of captured image angles used to the number of projections or viewing perspectives.

Figure 1:
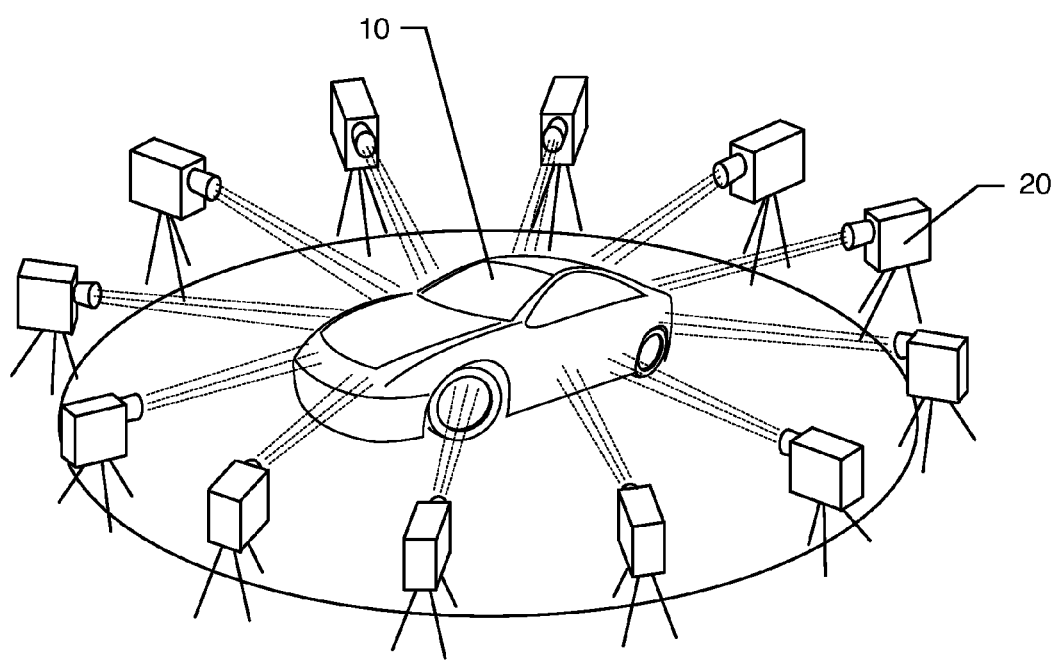
FIG. 1 is a diagrammatic perspective view of a three-dimensional object having a ring of cameras capturing images from different angles of the three-dimensional object, in accordance with the embodiments described herein.

The first step is to generate a plurality of images of a three-dimensional object from a plurality of angles. This can be done a number of ways. As indicated above, the three-dimensional object can be created from animation, that is, on a computer or the like. Alternatively, a three-dimensional object can be a real object which has images taken thereof from various angles, such as through use of film or digital photography. FIG. 1 illustrates an exemplary real three-dimensional object 10 in the form of an automobile. The cameras 20 are positioned around the car 10 so as to capture or generate images from a plurality of angles. In a preferred embodiment, the cameras 20 are positioned on substantially the same plane and equally spaced apart from one another. FIG. 1 illustrates, for exemplary purposes, twelve cameras 20 spaced evenly apart so as to completely encircle the automobile 10. Thus, each camera 20 is spaced thirty degrees apart from the adjoining camera 20. Although fewer cameras 20 can be utilized, using a larger number of cameras provides increased viewing angles so as to generate a seamless, realistic looking three-dimensional image of the object 10. Thus, for example, if thirty-six cameras 20 were utilized, they would preferably be spaced ten degrees apart from one another on the same plane. The cameras 20 need not necessarily be on the same plane, however, as described below with respect to FIGS. 10-18. Preferably, each camera 20 that captures and generates images from different planes or angles has a corresponding projector or other similar display surface (e.g., an LCD screen) for use in association with a display device that can reproduce the captured image at that particular angle and location. To create a full three hundred sixty degree image of the object 10, the photographer would need to place a plurality of cameras 20 so as to completely surround the object 10.

Figure 2:
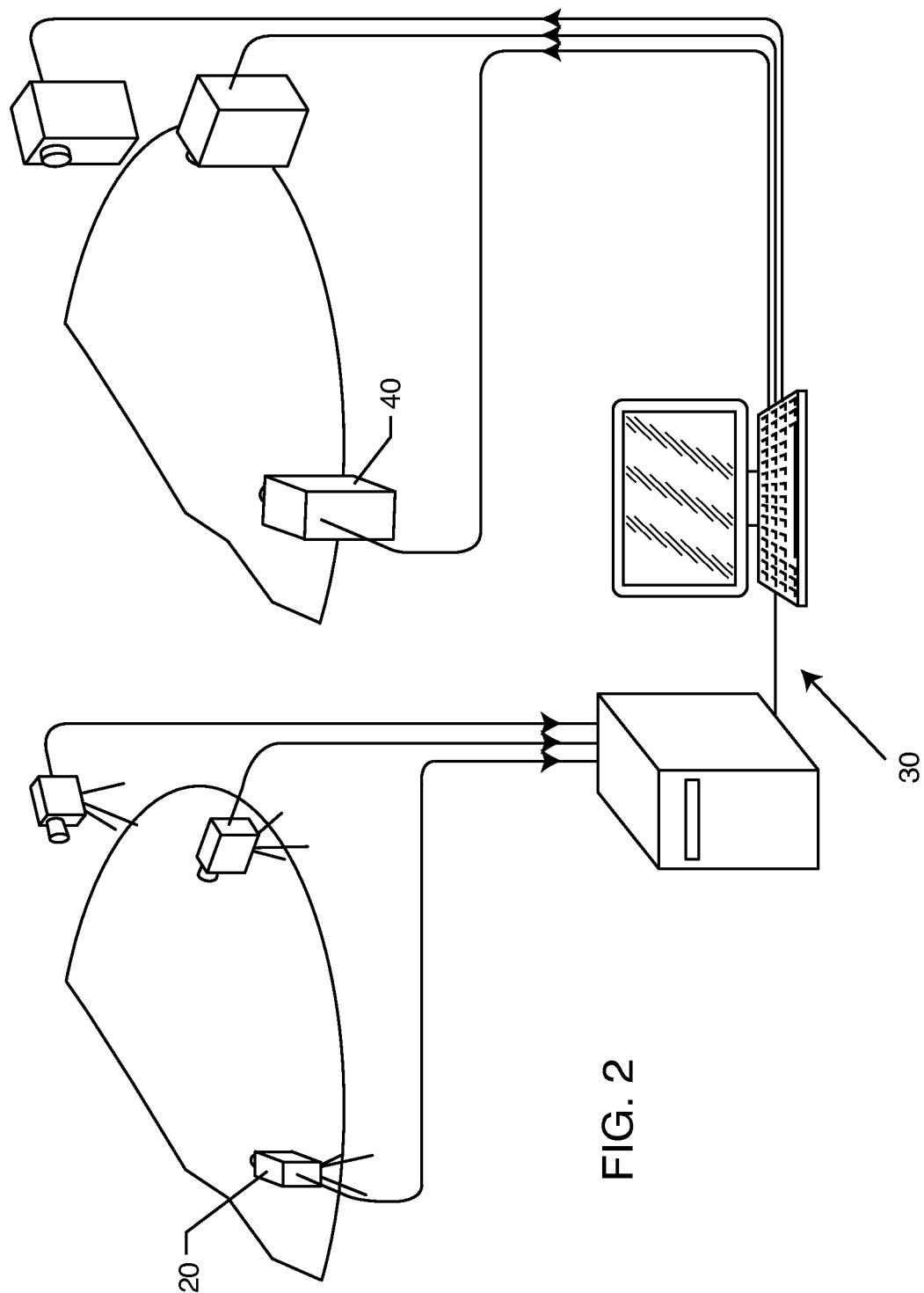
FIG. 2 is a diagrammatic view illustrating the processing of the generated images, and subsequent projection of the captured images.

With reference now to FIG. 2, the generated or captured images are transferred to a computer system 30 having software capable of playing back an unlimited number of streams of video in synchronization. Thus, the images, whether they be still photographs or more preferably video footage, is transferred to the computer 30 for processing. If film photography is used in the first step, then film photographs must be converted to digitized signals or files for importation into the computer 30 so that the software can manipulate the data. Software capable of playing back in an unlimited number of streams of video and synchronization currently exist, and is often used for music concerts or trade shows. One such software application is called by the brand name Renewed Vision™.

With continuing reference to FIG. 2, the computer 30 feeds projectors 40 for projection onto a display screen of a display system, as will be more fully described herein. The computer will send a corresponding stream of data to each projector 40 which corresponds with the images captured or generated by a camera 20 at that particular location or angle. Typically, the projectors 40 continuously project an image of the object 10 as captured by the corresponding camera 20 towards a display screen. This projected image is synchronized and timed with the other images which are to be projected and displayed.

Figure 3:
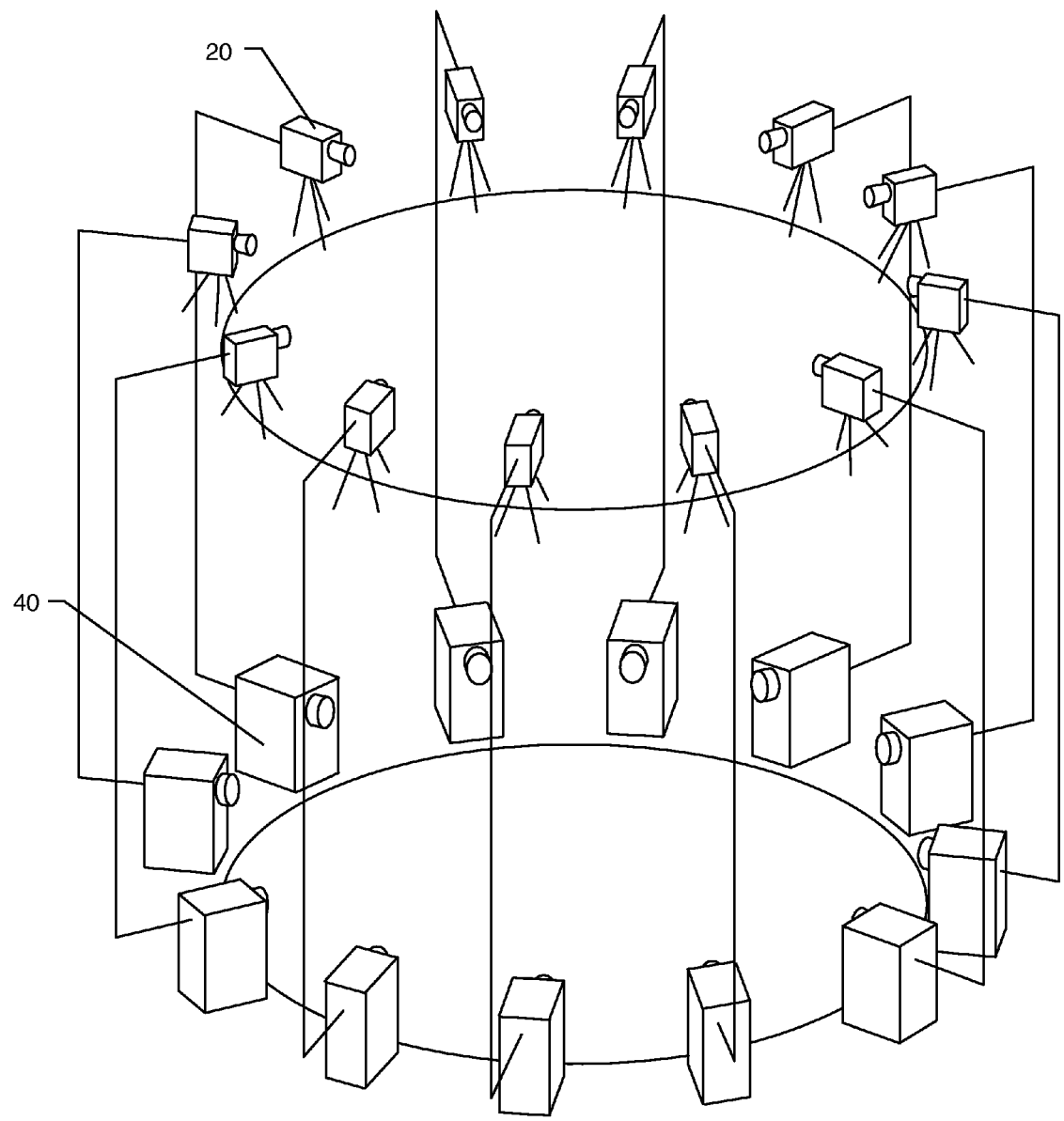
FIG. 3 is a diagrammatic view illustrating the relationship between the image projectors and the cameras.

With reference now to FIG. 3, in the embodiments which utilize projectors 40, the ring of projectors 40 preferably match the number and ring of cameras 20. If the cameras 20 were formed in a perfect circle and spaced apart thirty degrees from one another, as illustrated, the projectors 40 will be formed in a perfect circle and spaced apart thirty degrees from one another so as to match the cameras 20 and their respective angles. As illustrated in FIG. 3, twelve cameras 20 were used to capture or generate images of the three-dimensional object 10 in FIG. 1. Thus, a corresponding twelve projectors 40 would be placed at the exact same position or angle as a corresponding camera 20 so as to project and display the captured image from the corresponding camera 20 angle.

Figure 4:
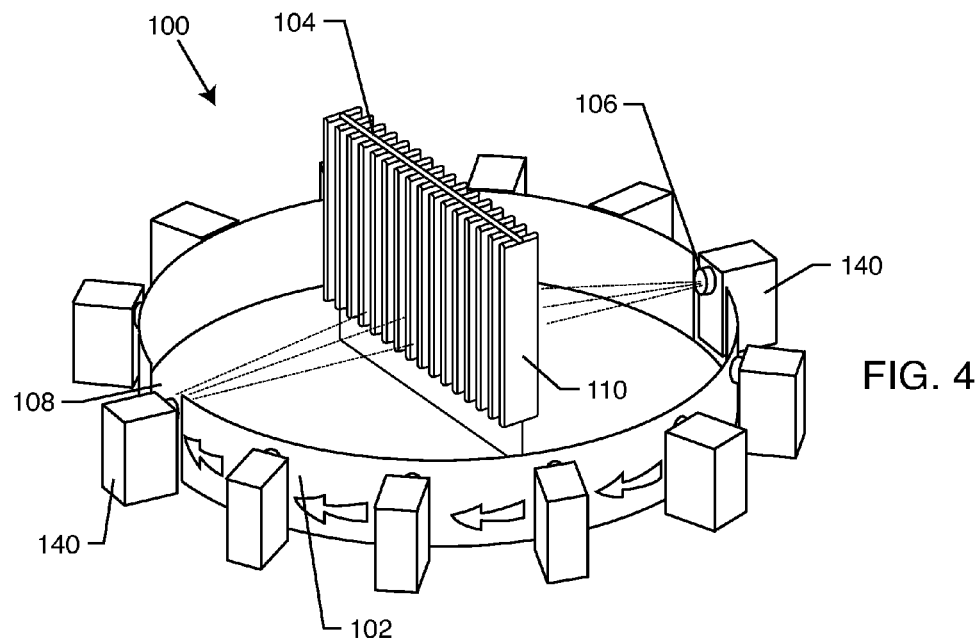
FIG. 4 is a perspective view of an image projection system capable of reproducing the three-dimensional object as a three-dimensional image viewable from different perspectives as disclosed herein.
Figure 5:
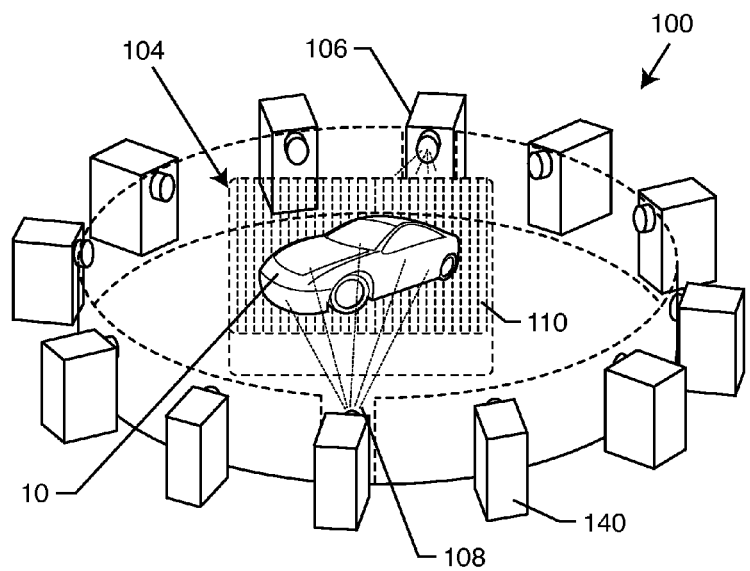
FIG. 5 is a view similar to FIG. 4, illustrating the viewing of an image of the three-dimensional object on the rotating screen as the rotating screen and wall present a viewable angle.

FIGS. 4 and 5 illustrate a projection system 100 in accordance with the embodiments described herein. The system generally includes a cylindrical structure 102 forming a wall which is positioned between the projectors 140 and a screen 104 disposed within the generally circular wall 102. The screen 104, as illustrated in FIGS. 4 and 5 has two sides, or two display surfaces. However, it will be appreciated by those skilled in the art that the screen can have additional facets so as to include three display surfaces, four display surfaces, etc. The screen 104 can be of any type of screen which is capable of having projected images shown thereon and which can be rotated at a fairly high speed.

The cylindrical wall structure 102 is preferably comprised of a rigid, but lightweight material. The wall 102 can be smooth and cylindrical, or multi-faceted depending upon the need and desire of the design. Both the wall 102 and the screen 104 are rotated, such that a display surface of the screen 104 passes the same angle at least twenty-four times per second.

It will be seen that the wall includes two viewing ports or openings 106 and 108 formed therein. These viewing ports 106 and 108 correspond to the two opposite display surfaces of the screen 104, and are in constant alignment therewith. The screen 104 and the wall 102 may be rotated together, or independently, but at the same rate of speed and in synchronization such that the viewing ports 106 and 108 continuously are aligned with the opposite display surfaces of the screen 104. The wall structure 102 is configured to prevent projection of images from the individual projectors 140 onto the screen 104 at all times other than when the projector 104 is in alignment with a viewing port 106 or 108. For that fraction of a second, the image which is fed to projector 140 is projected onto one of the display surfaces of the screen 104. At all other times, the projectors 104 typically continuously project an image, however, this image or footage is projected onto the exterior surface of the wall 102, which is typically opaque such that the image is not viewed by the viewer. The wall 102 and the screen 104 are spun at a high velocity, such that each face or display surface of the screen 104 is displayed at least twenty-four times per second so as to create a twenty-four frames per second viewing angle, which the human eye views as being constant and uninterrupted. Any acceptable means of rotating the screen 104 and the wall 102 which are known in the art are contemplated herein. The important aspect is that the faces or display surfaces of the screen 104 should be in constant alignment with the openings or view ports 106 and 108 of the cylindrical wall 102.

The projectors 140 are fixed in position, so as to correspond with a camera 20 which generated or captured the image of a three-dimensional object which the particular projector 140 typically continuously projects. The projectors 140 do not otherwise spin. Moreover, in the typical embodiment, each projector 140 continuously projects the same image or footage. Preferably, the outer surface of the cylindrical wall 102 is a flat opaque black color, such that the image from each projector 140 is only seen when the image is shown through one of the view ports 106 or 108 and on the projector screen 104.

Thus, each projector 140 (the type of projector not being important) emits or projects a stream of video footage, typically the same image, continuously. The spinning flat black wall 102 allows the viewer to see only the projection from the projector 140 they are directly in line with as they walk around the ring of projectors 140. Thus, they see the three-dimensional image 10 from different projectors one at a time, each at a different viewing angle of the image, as generated or captured by the cameras 20, as illustrated in FIG. 1. The remaining projectors' images are blocked by the walled cylinder 102 when the projector 140 is not in alignment with one of the viewing ports 106 and 108. As the screen 104 and the walled cylinder 102 rotate together, the display surfaces of the screen 104 are only visible through the two viewing ports 106 and 108, which are positioned generally one hundred eighty degrees opposite from one another. Of course, the same image is projected through the viewing port 106 or 108 from each projector 140 as the viewing port 106 or 108 passes each projector 140. Thus, an individual viewing the object 10 at a given position will see the same image.

However, if that individual moves around the assembly 100, the individual will see different viewing angles of the image 10. For example, if the viewer was positioned at the front of the assembly 100, as illustrated in FIG. 5, the viewer will view the front image of the car 10. However, an individual positioned directly opposite the assembly 100 so as to be viewing a display surface of the screen 104 from generally the opposite angle would view the rear of the car. As the individual walked around the projector assembly 100, the viewer would see one side of the car, the back side of the car, the opposite side of the car, and then the front of the car as he or she walked around the entire assembly 100. As the image is projected onto a screen, the image 10 will appear to be solid and not holographic or ghost-like. Moreover, due to the high rate of spin of the cylindrical wall 102 and the screen 104, the projected image would appear to be suspended in air and perfectly three-dimensional.

In order to give the appearance of a continuous image, as described above, the image from each angle should be shown at least twenty-four times per second. Given the two-sided screen 104 illustrated in FIGS. 4 and 5, the screen 104 and the wall 102 would need to be rotated at least twelve rotations per second for the two-sided screen 104. In this manner, standing behind a projector 140 would yield the image being displayed on a display surface of the screen 104 at least twenty-four times per second.

With continuing reference to FIGS. 4 and 5, in order to preserve the quality of the image 10 viewed, the image should be viewed on a display surface of the screen 104 when the viewer is facing, such as substantially at a perpendicular angle to, the display surface of the screen 104. As the cylindrical wall 102 illustrated in FIGS. 4 and 5 is sufficiently short so as to enable the screen 104 to be viewable from different angles, the object provides means for blocking viewing of the screen such that the image on the screen 104 is viewable only when viewed substantially at a perpendicular angle to the screen. This can be done in a variety of ways. As illustrated in FIGS. 4 and 5, a plurality of spaced-apart members 110 are positioned in front of opposite display surfaces of the screen 104. This has the effect of vertical blinds, which prevent viewing of the display surface of the screen 104 unless the image is exactly perpendicular to the viewer, as illustrated in FIG. 5. As illustrated in FIG. 4, when the screen becomes non-perpendicular, the members 110 prevent viewing of the display surface of the screen 104. It will be appreciated that a lenticular lens or the like might be substituted for the vertical blind members 110. In this manner, an individual viewing the assembly 100 will not be able to view the image 10 until the image is substantially perpendicular to him or her. Thus, the trueness or clarity of the image 10 is maintained such that if a user is positioned directly behind one of the projectors 140, that individual sees only the view of the image 10 projected from that projector 140, and not any other.

Figure 6:
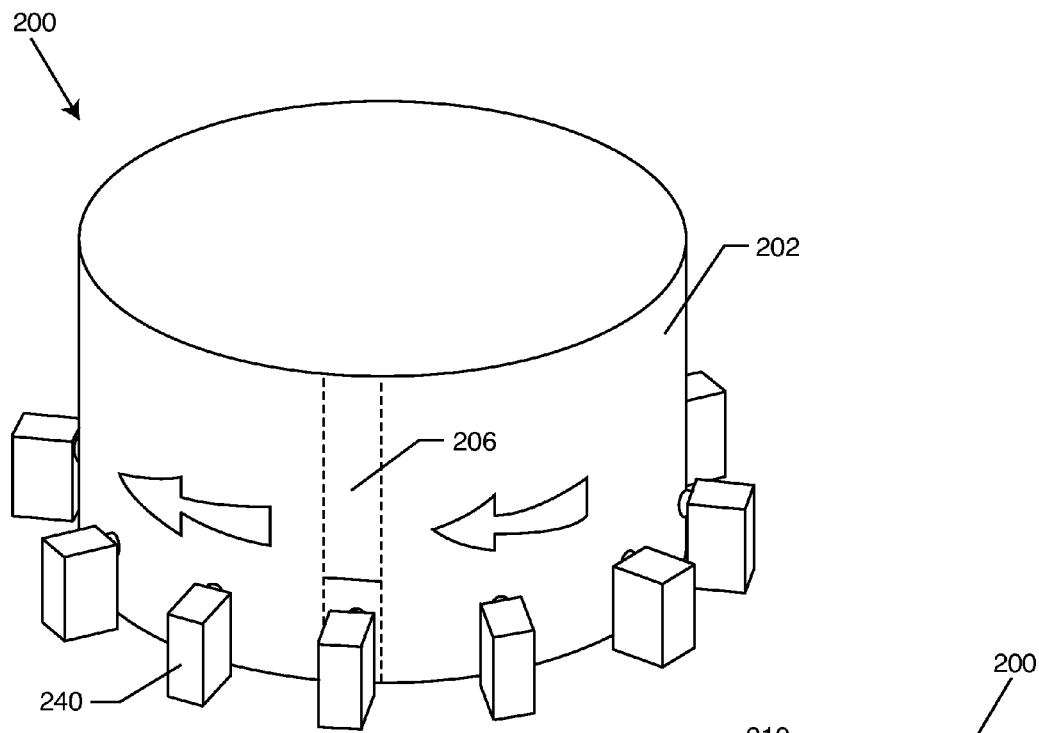
FIG. 6 is a perspective view of another projection system, with the screen being enclosed within a housing.
Figure 7:
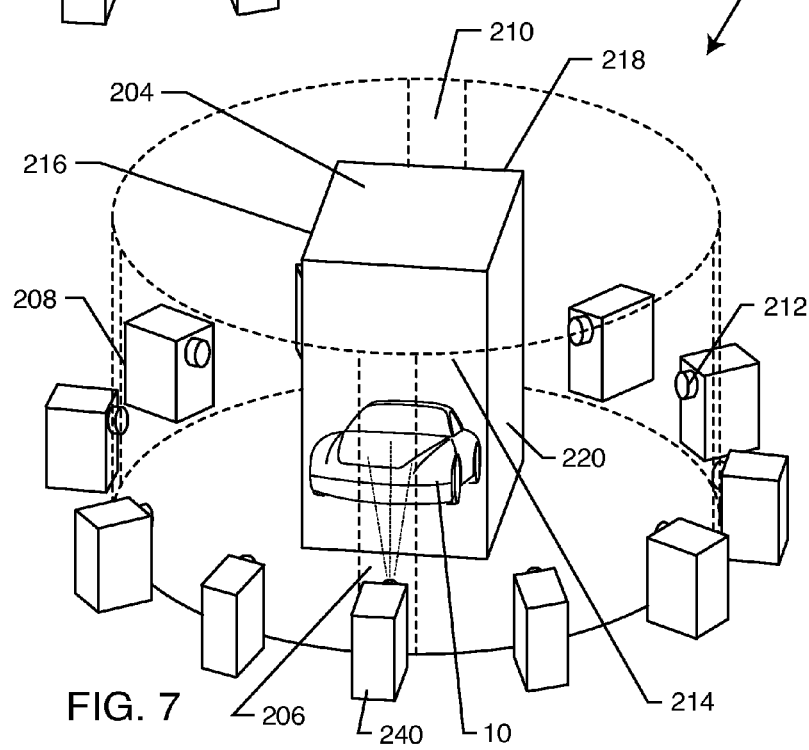
FIG. 7 is a perspective view similar to FIG. 6, but illustrating the housing in phantom so as to view the multi-faceted screen therein.

With reference now to FIGS. 6 and 7, another means of blocking viewing of the display surfaces of the screen such that each image on the screen is viewable only when viewed substantially facing the screen. Thus, the projection assembly 200 illustrated in FIGS. 6 and 7 utilizes a generally cylindrical housing 202 which defines the wall disposed between the screen 204 and the projectors 240 and which prevents the viewers from viewing the screen 204 at all unless positioned into an alignment with one of the view ports 206-212.

It will be noted that the cylindrical wall housing structure 202 in this embodiment has four viewing ports 206, 208, 210 and 212. This is because the screen 204 has four display surfaces 214-220. Thus, the cylindrical wall structure 202 has a viewing port 206-212 which is in alignment with each display surface 214-220 of the screen 204. These viewing ports 206-212 are in constant alignment with the display surfaces 214-220, as described above. If the screen 204 had three display surfaces, then the wall or housing would have a corresponding three viewing ports, etc.

In the embodiment illustrated in FIGS. 6 and 7, there is no vertical blind structure or lenticular lens or the like associated with the screen 204. This is due to the fact that the screen 204 is not capable of being viewed by the viewer unless the viewer views a display surface 214-220 through a viewing port 206-212 as the viewing port 206-212 passes the particular projector 240 which the viewer has positioned himself or herself behind. If there are a sufficiently large number of projectors and the viewing port 206-212 is sufficiently narrow, there is no need for such image blocking means. However, a lenticular lens, vertical blind assembly or the like may be incorporated to prevent all but an exact perpendicular view of a display surface 214-220 of the screen 204. In any event, the particular image 10 from a given projector 240 will only be viewable when the display surface of the screen 204 is substantially aligned with the viewing angle of the viewer.

With continuing reference to FIGS. 6 and 7, and in particular with respect to FIG. 7, in the illustrated example, there are twelve projectors 240 which are equally spaced apart from one another so as to match the ring of cameras 20, as illustrated in FIG. 1. As the screen 204 has four display surfaces, there are four view ports 206-212 formed in the cylindrical housing 202. Thus, the screen 204 and the cylindrical housing 202 must be rotated at least six times per second so that the image 10 from each angle or projector 240 is shown on a display surface 214-220 at least twenty-four times per second.

Once again, as the viewer walks around the projection system 200, and behind a projector 240, a different angle of the three-dimensional object image 10 will be shown. That is, the front of the car, a side of the car, a rear view of the car, an opposite side view of the car, and the front view of the car again if one were to walk completely around the projection assembly 200 and the three-dimensional object were a car, as illustrated in FIG. 1, the image of the car 10 would appear to be solid and real due to the projection onto the screen 204. That is, the object would appear to be as real as one viewing a digital photograph of a front of a car, and then a side of the car, rear of the car, etc. from different angles. The difference being is that the number of projectors 240 and the angles used give the object image 10 a complete three hundred sixty degree viewing angle and image experience so as to appear relatively continuous, solid and real.

Figure 8:
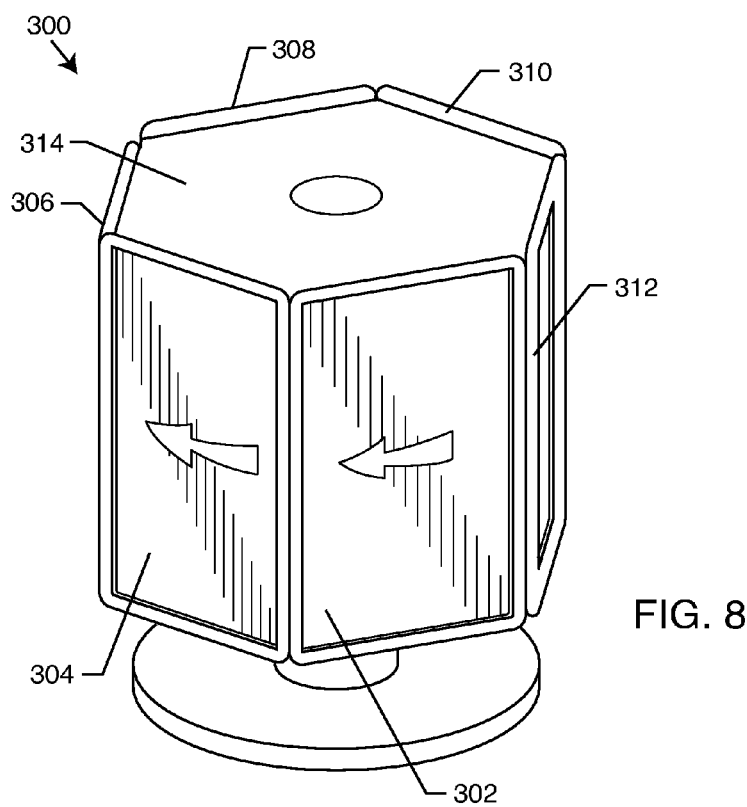
FIG. 8 is a perspective view of another projection system having a plurality of electronic monitors arranged on a rotatable assembly.
Figure 9:
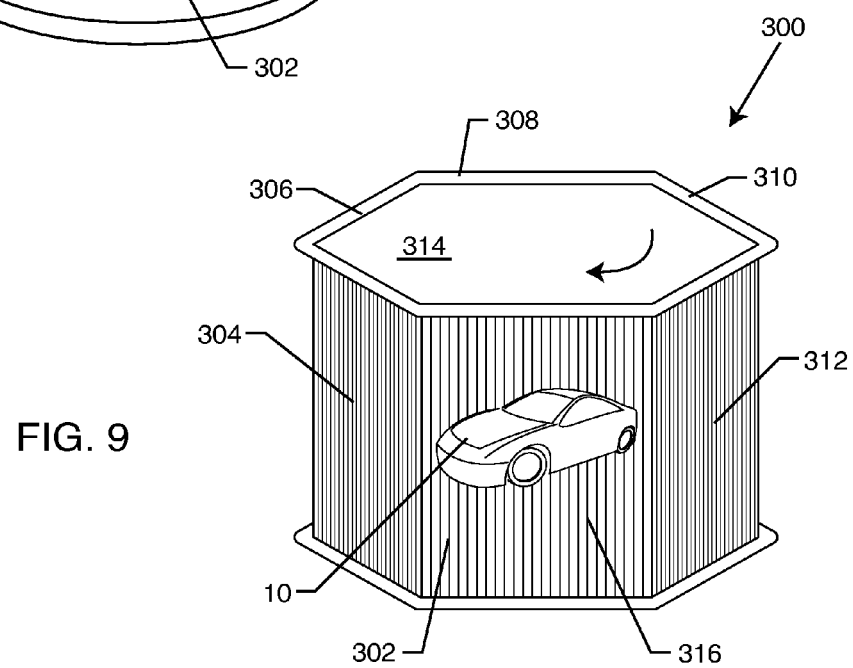
FIG. 9 is a perspective view similar to FIG. 8, illustrating an image of the three-dimensional object viewable on a monitor thereof.

With reference to FIGS. 8 and 9, in yet another embodiment, a projection assembly 300 includes a plurality of electronic screens 302-312 attached to a housing or framework 314 so as to be rotated at a high speed. It will be appreciated by those skilled in the art that there can be as few as two electronic screens attached back-to-back, or many more. In the illustrated example, there are six electronic screens which are positioned side-by-side such that the front of the screen is directed outwardly to the frame assembly 314.

Preferably, each screen 302-312 will have either vertical blind members, as described above, or a lenticular screen 316, as illustrated, attached thereto so as to prevent viewing of the image 10 from anything other than an exact perpendicular angle to the viewer. Thus, as the screens 302-312 rotate together, they are each only visible when the individual viewing image is directly perpendicular to a particular image angle. That is, they are only viewable when the individual is positioned exactly perpendicular to any given screen 302-312.

Any type of electronic screen or monitor may be used. For exemplary purposes, an LCD screen or screens can be used. Currently, LCD screens can display two hundred forty frames per second (240 Hz). Other LCD screens can display sixty frames per second, or one hundred twenty frames per second. This number, divided by the speed of rotation, will determine the number of viewable angles.

For example, the assembly 300 illustrated in FIGS. 8 and 9 includes six LCD electronic monitors. Thus, in order to obtain at least a twenty-four frames per second speed, such that each image from any given viewing angle will be viewed twenty-four times per second, the assembly 300 of six screens will need to be rotated at at least four times per second, each screen passing the viewing angle four times per second so as to create a twenty-four frames per second image rate. If eight LCD screens were used, the assembly 300 would only need to be rotated three times per second to attain the twenty-four frames per second rate.

Thus, if the LCD screens were 240 Hz monitors, and six LCD screens were placed on the framework 314 and rotated at four times per second, the assembly 300 would have sixty viewable angles (240 Hz÷4 rotations per second). In other words, every six degrees would present a new viewable angle. This would present the maximum viewable angles of the assembly 300. If an assembly 300 were presented with eight LCD monitors, each monitor having a 120 Hz speed, then such an assembly would have forty viewable angles, spaced apart from one another by nine degrees.

As the screens 302-312 rotate, the angle of the image 10 changes to match the angle of rotation. The rotation speed is preferably constant and the material displayed is predesigned to match that speed. That is, the digital images are provided to each electronic screen for display at predetermined intervals. In the examples illustrated in FIGS. 8 and 9, for every six degrees of rotation, the image on the LCD screen 302-312 would change to present a new image if all sixty viewable angles were utilized. In that manner, a viewer standing at a viewable angle would constantly see the same image from the rotating screens 302-312. However, as the viewer moved either to the left or to the right, every six degrees the viewer would view a new angle or image of the three-dimensional object.

More particularly, the image to be recorded may be done in the same way such as utilizing a ring of cameras as illustrated in FIG. 1. However, the number of cameras in playback is determined by the number of screens and speed of rotation. Using the illustrated example of six LCD screens spinning at four rotations per second, each LCD screen playing back two hundred forty frames per second, this yields sixty angles of view at twenty-four frames per second. Thus, sixty cameras set six degrees apart would be necessary to create the footage of the image at the maximum viewing angles. The footage would then be put on the computer 30 and edited together to create six 6° offset movies of the image 10 spinning at the opposite rate of the LCD screens. In other words, four counter-clockwise rotations per second. Software could be used to automate this process. Thus, when the screen 302-312 is spinning, the image 10 appears to be still, due to the opposite rotation of the screen and the image, which can be viewed at all three hundred sixty degree angles as one walks around the assembly 300.

Using the example of an assembly 300 having eight LCD screens, each rotating three rotations per second, and each LCD playing back one hundred twenty frames per second, forty angles of view are yielded at twenty-four frames per second. Thus, forty cameras set nine degrees apart would be necessary to create the footage of the image, which would then be processed using a computer and edited together to create eight nine-degree offset movies of the image spinning in the opposite rate of the LCD screens.

Figure 10:
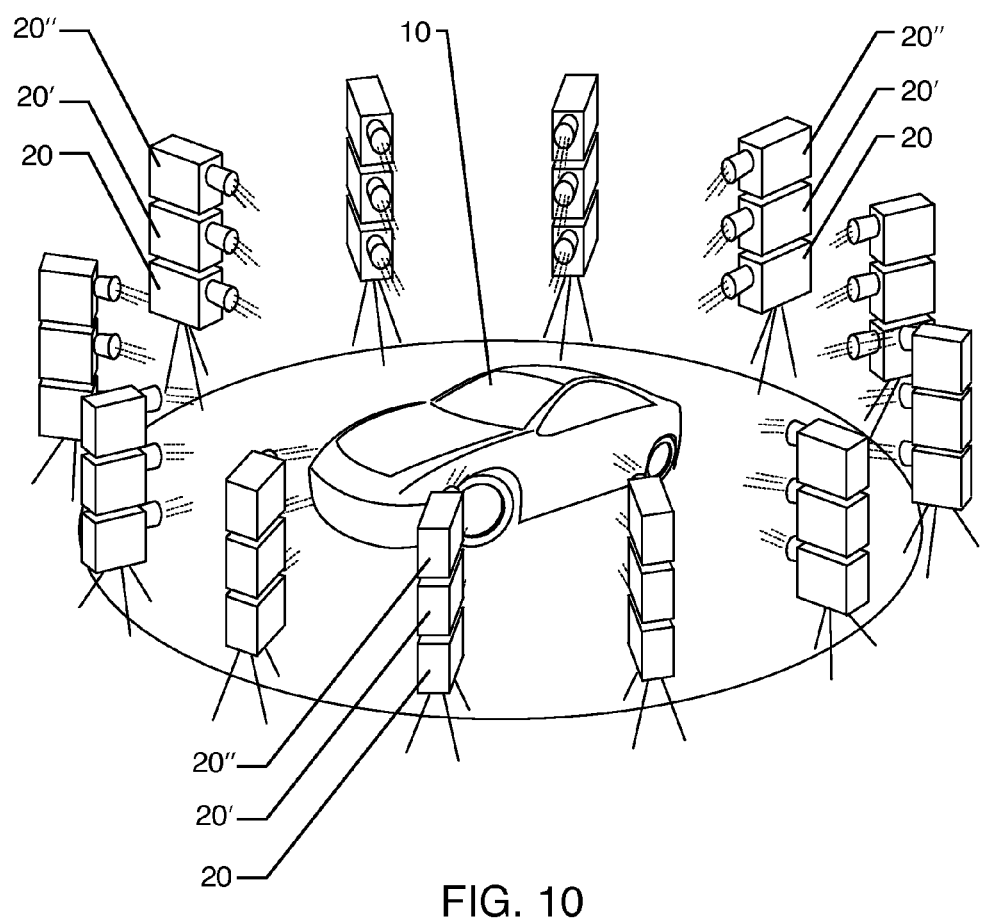
FIG. 10 is a diagrammatic perspective view similar to FIG. 1, illustrating a set of cylindrically arranged cameras capturing images from different angles of the three-dimensional object.

FIG. 10 illustrates an alternative embodiment for capturing images of the three-dimensional object 10. Here, the three-dimensional object 10 in the form of an automobile includes the aforementioned plurality of lower cameras 20, and an additional set of intermediate cameras 20' and upper cameras 20". The cameras 20, 20', 20" are positioned around the car 10 so as to capture or generate images from a plurality of angles (e.g., 30 degrees in this example). Like the embodiment in FIG. 1, each of the cameras 20, 20', 20" are preferably disposed in the same plane as one another. That is, the lower cameras 20 are disposed in the same plane; the intermediate cameras 20' are disposed in the same plane; and the upper cameras 20" are disposed in the same plane. This particular arrangement of stacked cylindrical cameras 20, 20', 20" can be used in association with the systems described herein to reproduce the three-dimensional object 10 as a three-dimensional image viewable in association with a cylindrical display. In this respect, this embodiment is different than the one described with respect to FIG. 1 in that a vertical component or additional plane adds depth to image reproduction. As such, the viewing perspectives should not be limited to a single plane. The cameras 20, 20', 20" could be used in a number of different combinations, such as at various intermittent or equal angels around the exterior of the object 10, or at one or more different horizontal or vertical positions. FIG. 10 illustrates a preferred embodiment wherein three stacked cameras 20, 20', 20" are used in this cylindrical arrangement, but other combinations of cameras 20, 20', 20" may be used, such as combining a plurality of the cameras 20 and 20", cameras 20' and 20", etc. The angle that the camera captures images will be reproduced by a projector or other display device in accordance with a comparable viewing perspective.

Figure 11:
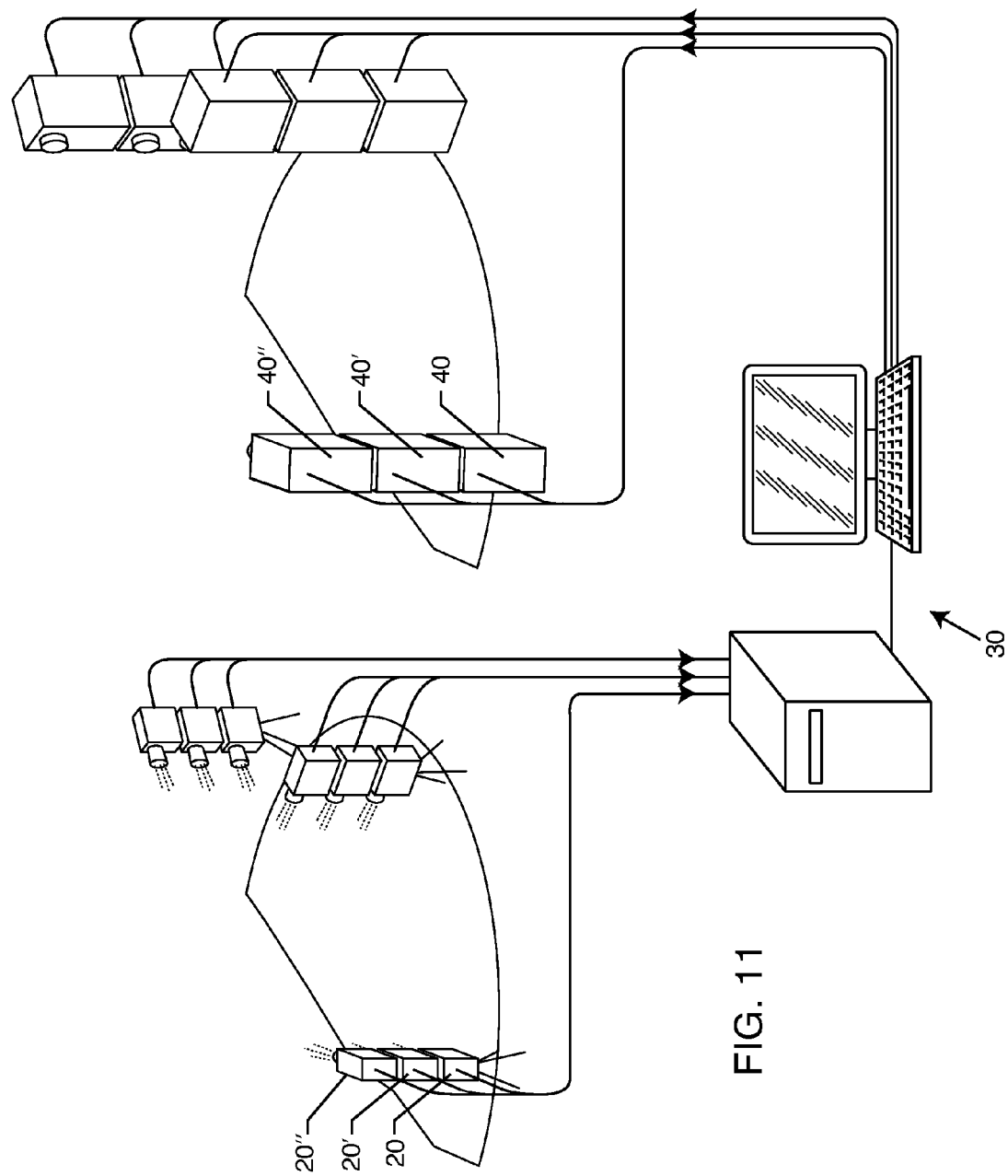
FIG. 11 is a diagrammatic view of a computer system processing the generated images from the plurality of cameras in FIG. 10, and synchronizing said images for subsequent display in association with corresponding projectors.

FIG. 11 illustrates processing the generated or captured images obtained from the plurality of cameras 20, 20', 20" with the computer system 30. In this respect, the computer system 30 ensures that each image captured or generated from the plurality of cameras 20, 20', 20" is synchronized with one another based on the time the image was captured. This is important so that the plurality of projectors 40, 40', 40" can project correlating images or video matching the three-dimensional object 10 at different perspectives as if the viewer were actually moving in and around the object 10. For the purposes described herein an "image" should be interpreted to include a single image, or a plurality of images that may be taken or played back-to-back in sequence in a video stream. The synchronized image data transferred to the computer system 30 includes software capable of playing back an unlimited number of streams of synchronized video.

The computer system 30 also matches the captured image or video stream from the cameras 20, 20', 20" with the corresponding projectors 40, 40', 40" that represent the perspective of the angle that the cameras 20, 20', 20" captured the three-dimensional object 10. In this embodiment, the projectors 40, 40', 40" project the images on to a cylindrical display screen as part of a cylindrical display system. Alternatively, the computer system 30 may operate in conjunction with display devices of other shapes and/or sizes capable of reproducing the captured images at perspectives representative as if the viewer were observing the actual three-dimensional object from the captured angle.

Figure 12:
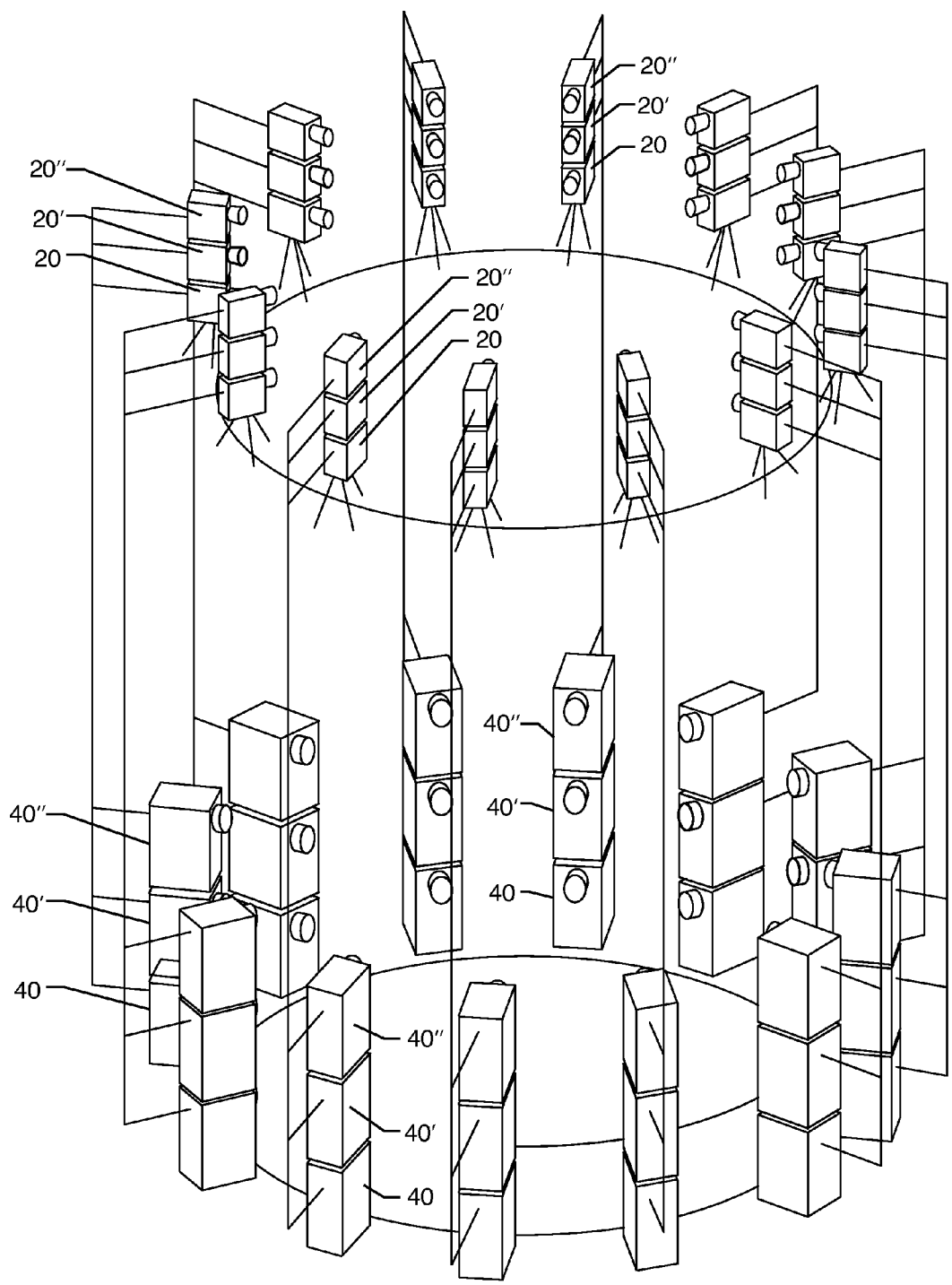
FIG. 12 is a diagrammatic view further illustrating the relationship between the cylindrically arranged cameras and associated projectors.

More specifically, FIG. 12 illustrates the correlation between the plurality of the cameras 20, 20', 20" and the projectors 40, 40', 40". Here, the number of projectors 40, 40', 40" matches the number of cameras 20, 20', 20". Although, in an alternative embodiment, it might be possible to have more cameras capturing data than related projectors (or vice-versa). The computer system 30 would be responsible for matching the cameras to the projectors/display devices. In this respect, the computer system 30 is preferably capable of sensing the number of cameras connected thereto. As part of sensing, the computer system 30 may automatically identify the different angles at which the images are being captured by the cameras. This may be accomplished through a bi-lateral communication exchange between each of the cameras 20, 20', 20" and the computer system 30; or via relative image recognition. That is, the computer system 30 may be able to selectively relatively compare the positioning of one image captured by a first camera 20, for example, relative to the positioning of another image captured by a second camera 20'. In this example, the computer system 30 may identify that the first image (captured by camera 20) is positioned at the same angle as the second image (captured by camera 20'); but that the first image were captured at some offset distance below the second picture. Preferably, this sensing sequence occurs among at least three of the cameras 20, 20', 20".

A similar procedure could be utilized below with respect to the spherical embodiment, wherein the computer system 30 is able to determine differences in camera positioning along the x-axis, y-axis and z-axis. This information may then be embedded in the media and used later for calibration purposes in association with the computer system 30, or another image reproduction device (e.g., at a store or theater).

Furthermore, the computer system 30 may also be able to identify one or more projectors (or other display equipment coupled thereto) capable of reproducing the captured images. As part of this identification, the computer system 30 may include calibration techniques to ensure that the image reproduction perspectives substantially match the angles at which the images were captured. That is, the computer system 30 would match the respective cameras, each representative of a certain viewing angle of the object 10, with the corresponding projector (or other display equipment) capable of reproducing the object 10 as if the viewer were observing the object 10 from that particular angle. In this respect, FIG. 12 illustrates an equal number of cameras 20/projectors 40; cameras 20'/projectors 40'; and cameras 20"/projectors 40" correlated to one another. The plurality of projectors 40, 40', 40" are able to reproduce the object 10 as an image viewable from respective cylindrical perspectives, as opposed to the single plane perspective described above with respect to FIG. 3. Of course, the display device may include any display system known in the art, such as those shown and described herein with respect to FIGS. 4-9.

Figure 13:
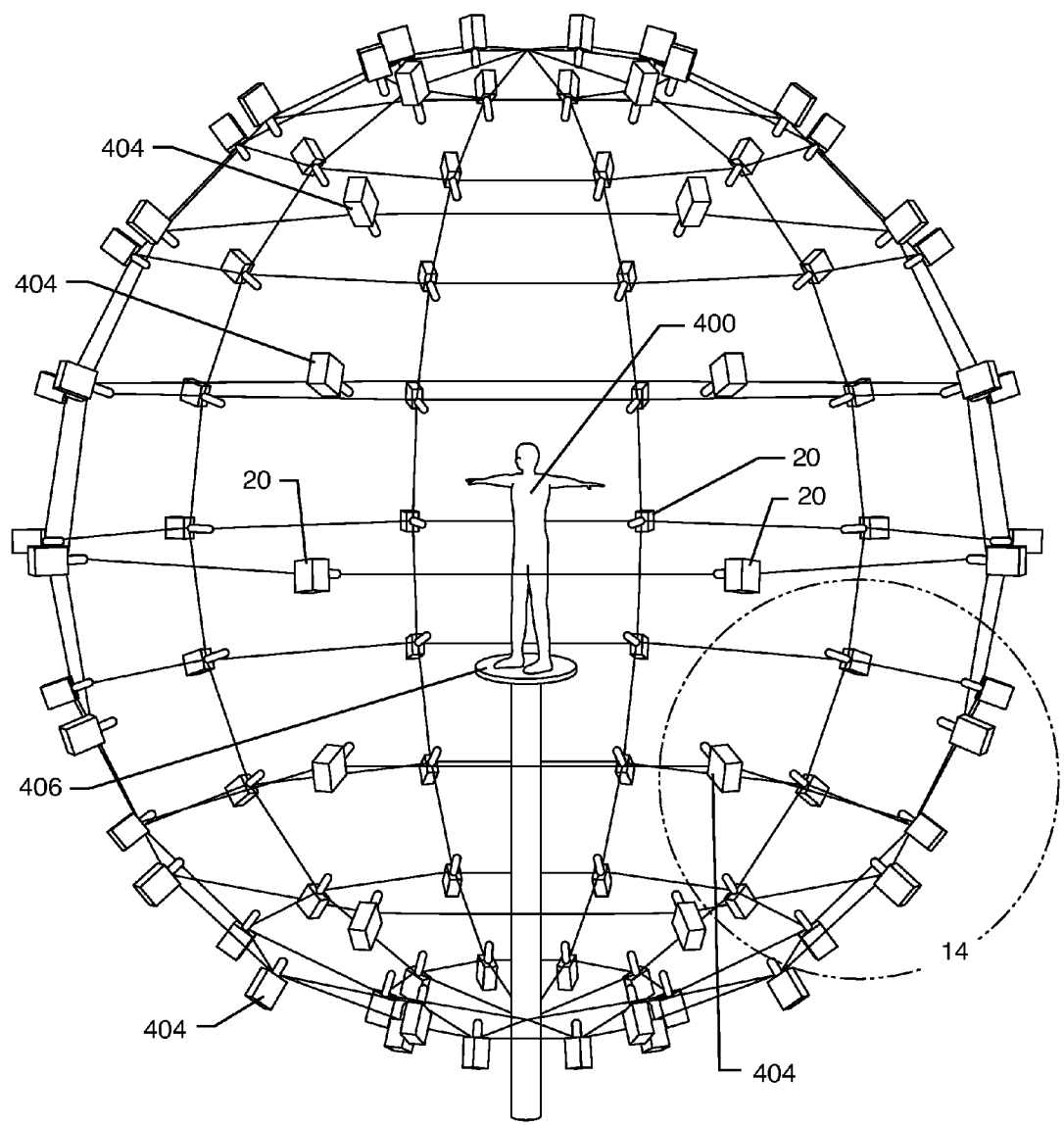
FIG. 13 is a diagrammatic perspective view similar to FIGS. 1 and 10, further illustrating a spherical arrangement of cameras capturing images of the three-dimensional object.
Figure 14:
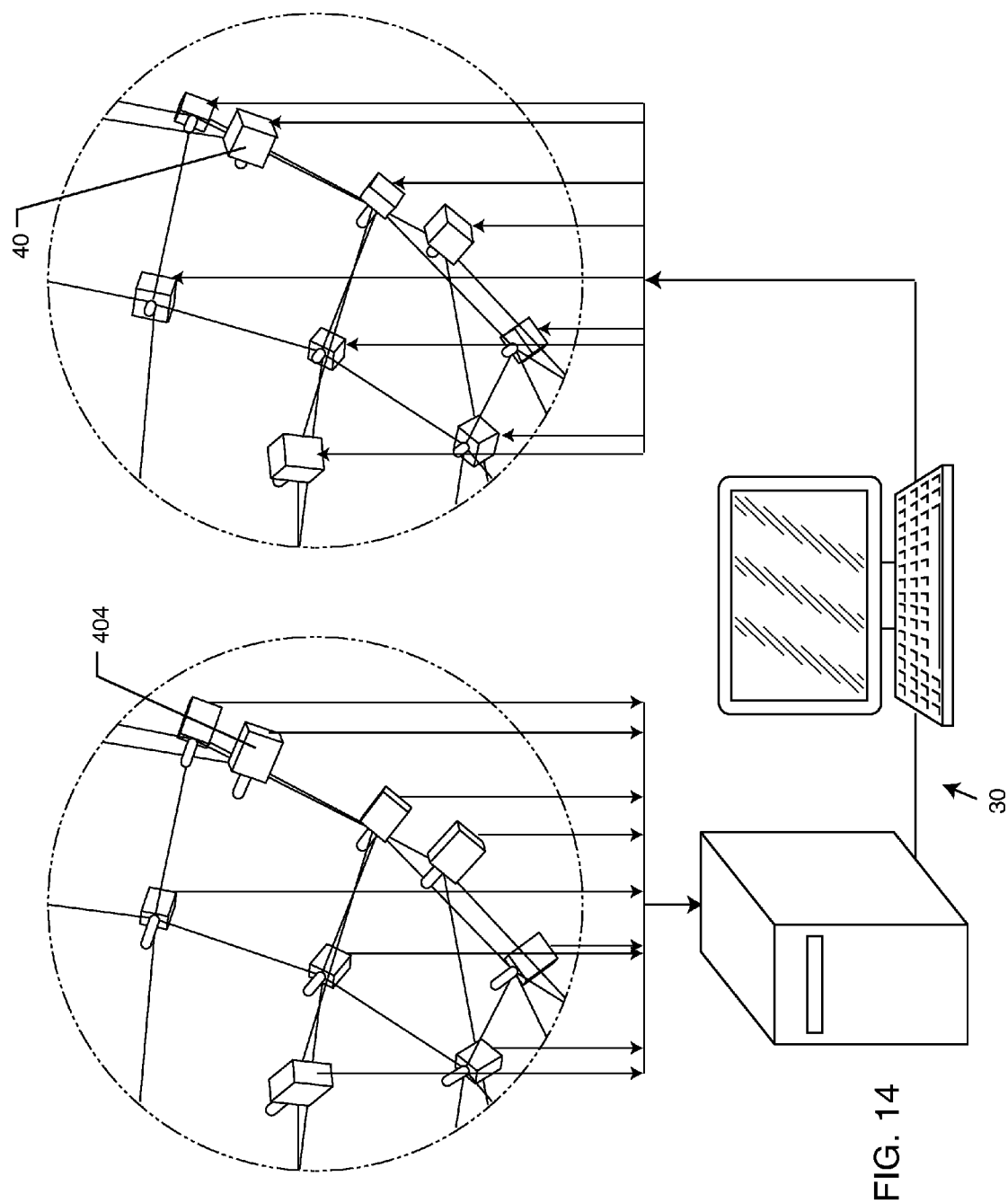
FIG. 14 is a diagrammatic view similar to FIGS. 2 and 11, illustrating the computer system processing the generated images from the plurality of cameras as taken about the circle 14 in FIG. 13, and synchronizing said images for subsequent display in association with corresponding projectors.
Figure 15:
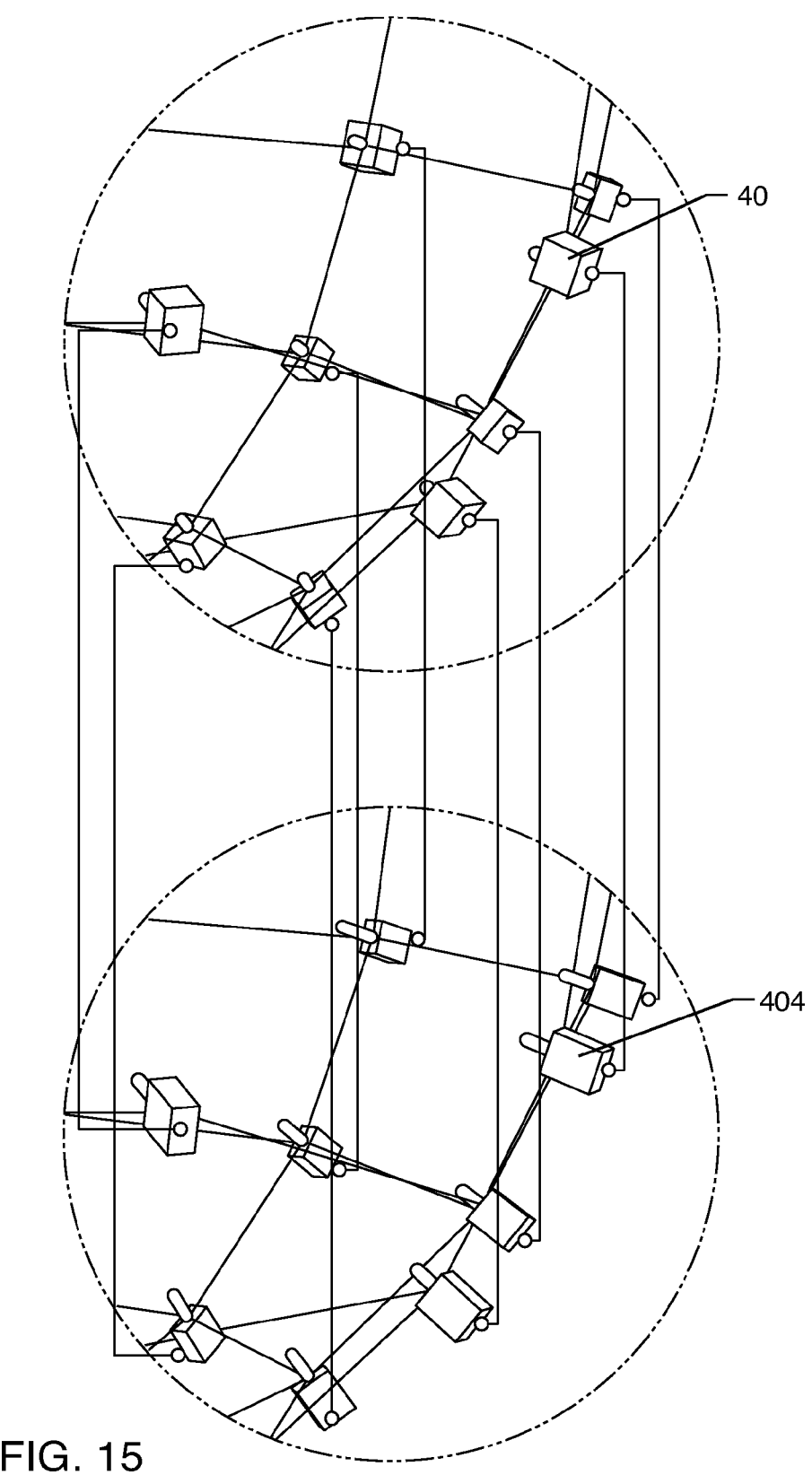
FIG. 15 is a diagrammatic view further illustrating the relationship between the spherically arranged cameras taken about the circle 14 in FIG. 13 and the corresponding spherical positioning of the associated projectors.

FIGS. 13-15 illustrate another alternative embodiment of the systems and methods described herein with respect to capturing a three-dimensional object 400 from a plurality of the cameras disposed in a spherical arrangement; and then reproducing said object 400 as a three-dimensional image 402 viewable from various perspectives also disposed in a similar spherical arrangement.

Specifically with respect to FIG. 13, the system includes a series of the cameras 20 disposed in and around the three-dimensional object 400 in spherical relation thereto. The cameras identified in FIG. 13 with numeral 20 are representative of the circular arrangement of cameras disposed around the object 10 described above with respect to FIGS. 1 and 10. The plane upon which the cameras 20 reside may be called the great circle or Riemannian circle—i.e., the "Equator" of the sphere. Additional cameras 404 may be deployed at various lines of latitude above and/or below the Riemannian circle. Preferably, the lines of latitude are equally spaced from one another and from the Riemannian circle. In the embodiment shown in FIG. 13, there are three lines of latitude above and below the Riemannian circle, which means that they are generally spaced apart from each other at thirty degree intervals. Likewise, the sphere includes twelve lines of longitude or meridians equally spaced apart at thirty degree intervals. In a particularly preferred embodiment, a camera 20 or 404 is disposed at each intersection between the lines of longitude and the lines of latitude and the Riemannian circle, as shown in FIG. 13, to provide an equidistant spherical three-dimensional reproduction of the three-dimensional object 400. The lines of latitude generally shrink in diameter to adhere to an invisible spherical boundary as they move away from the Riemannian circle. The three-dimensional object 400 may be positioned on a transparent surface or pedestal 406 such that the viewing angles of the cameras 404 are remain unobstructed.

In this respect, as generally described above with respect to FIGS. 2 and 11, FIG. 14 illustrates the aforementioned computer system 30 being used to synchronize data captured by the cameras 404 with the corresponding projectors 40 (or other display equipment). To illustrate this correlation, the images captured by the camera identified with numeral 404 are assigned to the projector assigned numeral 40. FIG. 15 further illustrates this correlation of all the cameras 404 and the projectors 40 through use of the connecting indicia. The software of the computer system 30 controls the synchronized playback of video streams or images, as described above.

Figure 16:
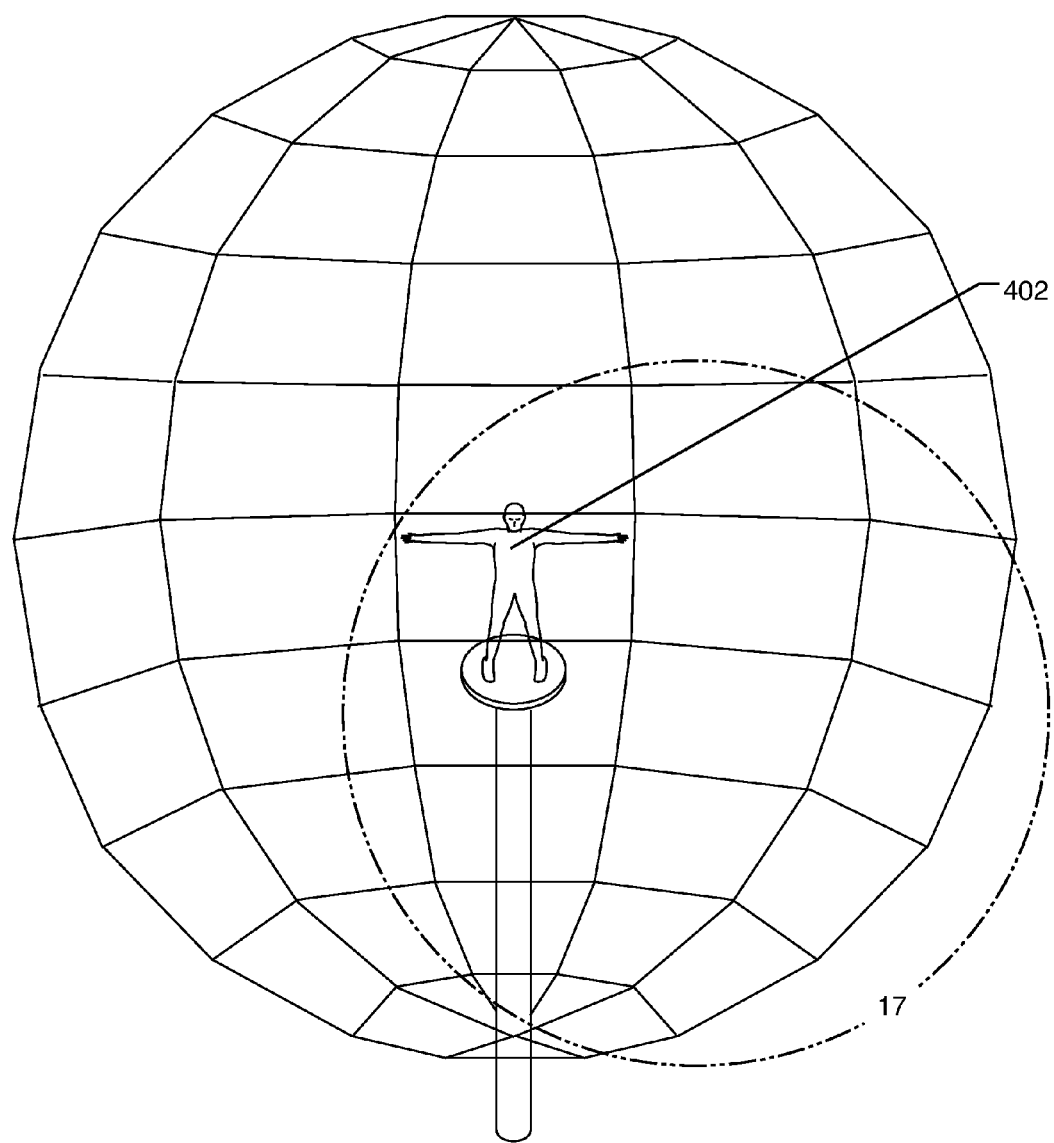
FIG. 16 is a front plan view of a display system capable of reproducing the three-dimensional object in a spherical display space.
Figure 17:
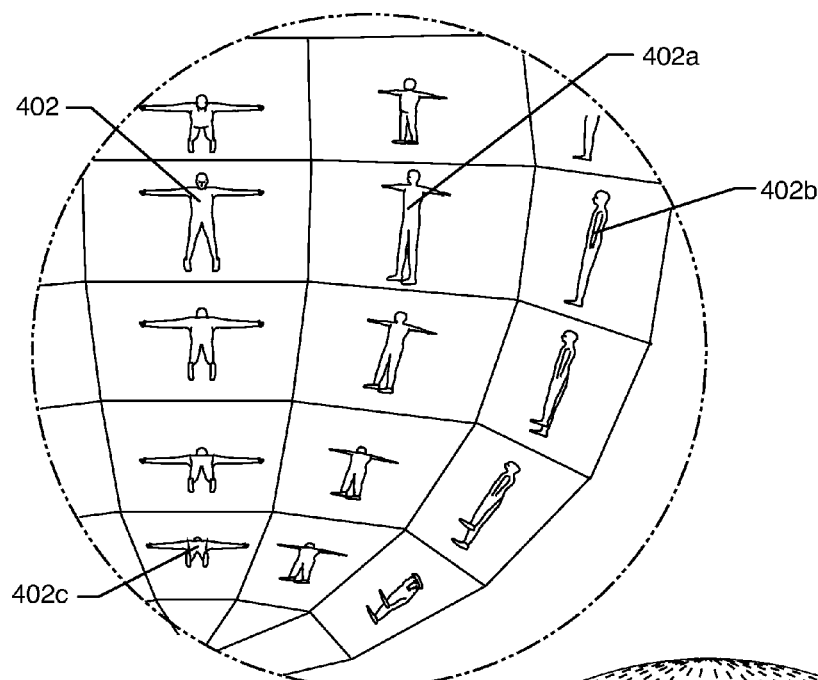
FIG. 17 is a more detailed perspective view of the display system of FIG. 16 as taken about the circle 17, further illustrating the three-dimensional image reproduced in association with different perspectives of the spherical display system.
Figure 18:
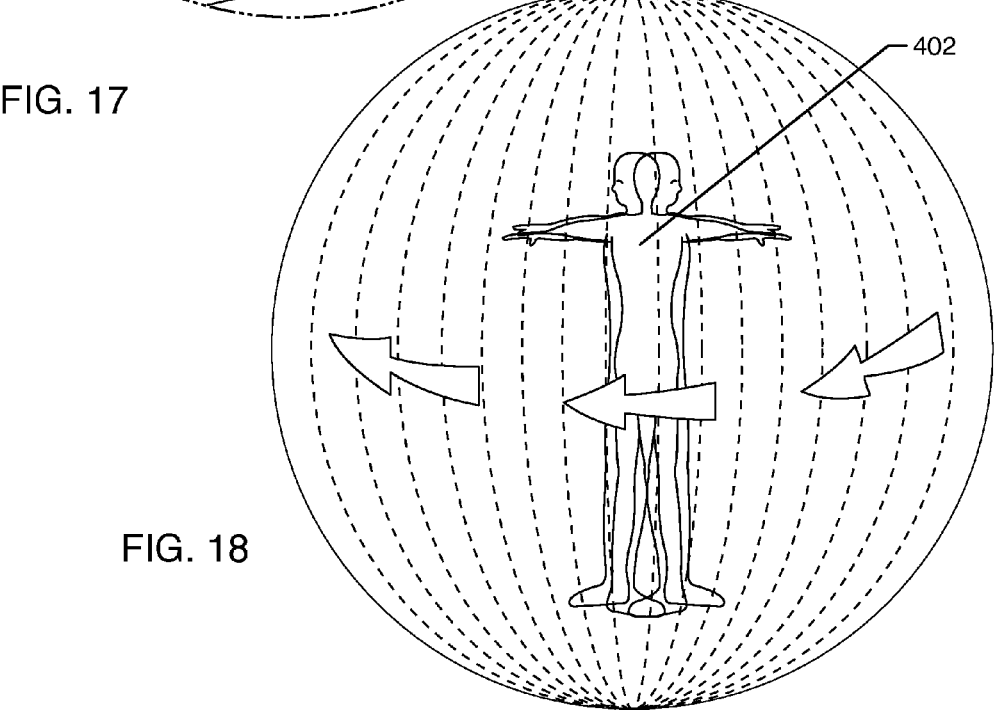
FIG. 18 is a perspective view of another display system having a plurality of electronic monitors arranged on a rotatable assembly to display the three-dimensional image in a spherical arrangement.

Like the embodiments described above, playback associated with replicating the three-dimensional appearance of the three-dimensional object 400 is provided from various viewing perspectives as shown in FIGS. 16-18. FIG. 16 illustrates one such perspective as a user may observe the three-dimensional object 400 from a front plan view. Here, the three-dimensional object 400 is illustrated as an image 402 as one would see the object 400 from this view. Further to this embodiment, FIG. 17 more specifically illustrates several different viewing perspectives of the object 400. For example, the three-dimensional image 402 in FIG. 17 is representative of the front plan view as may generally be seen in FIG. 16. As the viewer changes perspective by moving around the right of the three-dimensional image 402, a different view will be shown, such as the three-dimensional image 402a. Movement to this viewing perspective rotates the view of the three-dimensional object 400 around to the right. Continued movement to a perspective shown with respect to the three-dimensional image 402b illustrates the right side plan view of the three-dimensional object 400. Similarly, when changing perspectives from the three-dimensional image 402 to the three-dimensional image 402c, the viewer gradually sees changes in the image from the front plan view of the object 400 to a top plan view of the object 400 as depicted in image 402c. So, as the viewer rotates perspectives, it appears as if the three-dimensional object 400 is also rotating in three-dimensions as if the viewer were changing viewing angles of the object itself.

Increasing the number of cameras 20, 404 and projectors 40 increases the resolution of the reproduced image 402. Conversely, decreasing the number of cameras 20, 404 and the projectors 40 decreases the resolution. In this respect, the resolution determines how far the viewer must travel relative to the current view to obtain a new perspective. For example, if only three cameras 20 are used to capture the object 400 and only three projectors 40 are used to reproduce the image 402, the viewer must move 120 degrees to obtain a new perspective. Alternatively, if 360 cameras 20 are used to capture the object 400 and 360 projectors 40 are used to reproduce the image 402, the viewer must move one degree to obtain a new perspective. In this latter example, the higher resolution will better replicate or simulate the characteristics of the three-dimensional object 400 in a lifelike three-dimensional form.

In an alternative embodiment, the spherical embodiment described above with respect to FIGS. 13-17 could be used with a rotating display screen, as described above in detail, such that the three-dimensional image 402 is viewable as illustrated in FIG. 18.

It will be appreciated by those skilled in the art that the systems and methods described herein provide a three-dimensional image which appears to be suspended and solid so as to be viewed at all angles as one walks around the display device. Of course, this could have applications in advertising, medical science, engineering, design, military, etc. The methods and system disclosed herein overcome the deficiencies of the prior art in that a true three-dimensional image is created which is not volumetric or ghost-like in nature, but rather appears to be a real solid image.

Although several embodiments have been described in detail for purposes of illustration, various modifications may be made without departing from the scope and spirit of the invention. Accordingly, the invention is not to be limited, except as by the appended claims.

What is claimed is:

1. A method for producing media content that reproduces a three-dimensional object in association with a display device, comprising the steps of:
    recording the three-dimensional object from an array of cameras positioned at different angles relative to one another;
    synchronizing at least one image captured by each of the cameras based on the time each image was captured by each respective camera; and
    displaying the synchronized images in association with the display device such that each synchronized image is viewable from a different perspective to visually replicate the three-dimensional object as captured by the cameras, each of the synchronized images displaying the three-dimensional object from at least one of a different height, width, depth, and/or position in each respective perspective such that the three-dimensional object appears three-dimensional in connection with the display device when moving among the different perspectives as if moving around the three-dimensional object itself.

2. The method of claim 1, wherein the array comprises a cylindrical array of cameras disposed at equidistant intervals, including at least three cameras stacked on one another.

3. The method of claim 1, wherein the array comprises a spherical array including cameras equidistantly disposed from the three-dimensional object along an invisible spherical boundary.

4. The method of claim 3, wherein the cameras are disposed at an intersection point between a line of longitude and at least one of a line of latitude or a Riemannian circle.

5. The method of claim 1, including the step of streaming the synchronized images to the display device in real-time.

6. The method of claim 1, wherein the cameras angularly vary in an x-axis component, a y-axis component, and a z-axis component.

7. The method of claim 1, including the step of sensing the number of cameras and their relative positioning with a computer system.

8. The method of claim 7, wherein the sensing step includes the step of comparing the angular positioning of one image captured by one camera at one angle with another image captured by another camera at another angle to determine a relative x-axis, y-axis, and z-axis offset of the cameras.

9. The method of claim 8, including the step of calibrating the display device based on the relative x-axis, y-axis, and z-axis offset.

10. The method of claim 8, including the step of embedding the media content with metadata that includes the x-axis, y-axis, and z-axis offset.

11. The method of claim 1, wherein the display device comprises a projector or an LCD screen.

12. A method for producing media content that reproduces a three-dimensional object in association with a display device, comprising the steps of:
    recording the three-dimensional object from an array of cameras disposed at equidistant intervals around the three-dimensional object, wherein at least three cameras are stacked on one another;
    synchronizing at least one image captured by each of the array of cameras based on the time each image was captured by each respective camera;
    displaying the synchronized images in association with the display device such that each synchronized image is viewable from a different perspective to visually replicate the three-dimensional object as captured by the array of cameras, each of the synchronized images displaying the three-dimensional object from at least one of a different height, width, depth, and/or position in each respective perspective such that the three-dimensional object appears three-dimensional in connection with the display device when moving among the different perspectives as if moving around the three-dimensional object itself; and sensing the number of cameras and their relative positioning with a computer system by comparing the angular positioning of one image captured by one camera at one angle with another image captured by another camera at another angle to determine a relative x-axis, y-axis, and z-axis offset of the cameras.

13. The method of claim 12, including the step of streaming the synchronized captured images to the display device in real-time, wherein the display device comprises a projector or an LCD screen.

14. The method of claim 12, including the steps of calibrating the display device based on the relative x-axis, y-axis, and z-axis offset and embedding the media content with metadata that includes the x-axis, y-axis, and z-axis offset.

15. A method for producing media content that reproduces a three-dimensional object in association with a display device, comprising the steps of:
   recording the three-dimensional object with an array of cameras equidistantly disposed from the three-dimensional object along an invisible spherical boundary;
   synchronizing at least one image captured by each of the array of cameras based on the time each image was captured by each respective camera;
   displaying the synchronized images in association with the display device such that each synchronized image is viewable from a different perspective to visually replicate the three-dimensional object as captured by the array of cameras, each of the synchronized images displaying the three-dimensional object from at least one of a different height, width, depth, and/or position in each respective perspective such that the three-dimensional object appears three-dimensional in connection with the display device when moving among the different perspectives as if moving around the three-dimensional object itself; and
   embedding the media content with metadata that includes an x-axis, y-dimensional axis, and z-axis offset of one image relative to another image.

16. The method of claim 15, including the step of streaming the images to the display device in real-time, wherein the cameras are disposed at an intersection point between a line of longitude and at least one of a line of latitude or a Riemannian circle.

17. The method of claim 15, including the step of calibrating the display device based on the relative x-axis, y-axis, and z-axis offset, wherein at least three of the cameras angularly vary in an x-axis component, a y-axis component, and a z-axis component.

18. The method of claim 15, including the step of sensing the number of cameras and their relative positioning with a computer system, wherein the display device comprises a projector or an LCD screen.

19. The method of claim 18, wherein the sensing step includes the step of comparing the angular positioning of one image captured by one camera at one angle with another image captured by another camera at another angle to determine the relative x-axis, y-axis, and z-axis offset of the cameras.

20. The method of claim 15, herein the array of cameras comprises a spherical arc of cameras positioned between 90 and 180 degrees relative to the three-dimensional object.

* * * * *